US008935330B2

(12) United States Patent
Jellard (10) Patent No.: US 8,935,330 B2
(45) Date of Patent: Jan. 13, 2015

(54) REDIRECTING MESSAGES IN A PUBLISH/SUBSCRIBE MESSAGING SYSTEM (75) Inventor: Edward G. Jellard, Southampton (GB)

(73) Assignee: International Business Machines Corporation, Armonk, NY (US)

(*) Notice: Subject to any disclaimer, the term of this patent is extended or adjusted under 35 U.S.C. 154(b) by 156 days.

(21) Appl. No.: 13/412,416

(22) Filed: Mar. 5, 2012

(65) Prior Publication Data
US 2012/0290655 A1 Nov. 15, 2012

(30) Foreign Application Priority Data
May 11, 2011 (EP) .................................. 11165736

(51) Int. Cl.
G06F 15/16 (2006.01)
G06Q 10/10 (2012.01)
H04L 12/58 (2006.01)

(52) U.S. Cl.
CPC ............... G06Q 10/10 (2013.01); H04L 51/14 (2013.01)
USPC ............ 709/204; 709/206; 370/406; 370/489

(58) Field of Classification Search
CPC . H04L 45/00; H04L 67/2814; H04L 12/5855; G06F 17/30867; G06F 15/16
USPC .......................... 709/204, 206; 370/406, 486
See application file for complete search history.

(56) References Cited

U.S. PATENT DOCUMENTS

| 7,010,582 | B1 | 3/2006 | Cheng et al. |
| 7,272,854 | B2 | 9/2007 | Marceau et al. |
| 7,529,794 | B2 | 5/2009 | Dorai et al. |
| 7,602,895 | B2 * | 10/2009 | Terry et al. ............... 379/215.01 |
| 7,792,908 | B2 | 9/2010 | Charters et al. |
| 7,822,801 | B2 | 10/2010 | Zhao et al. |
| 2004/0028080 | A1 * | 2/2004 | Samarasinghe et al. ...... 370/486 |
| 2005/0053216 | A1 * | 3/2005 | Spencer et al. .......... 379/211.01 |
| 2005/0123118 | A1 * | 6/2005 | Terry et al. ............... 379/211.02 |
| 2006/0248586 | A1 * | 11/2006 | Delaney et al. .................. 726/22 |
| 2008/0133541 | A1 | 6/2008 | Fletcher et al. |
| 2008/0256553 | A1 | 10/2008 | Cullen |
| 2009/0017827 | A1 * | 1/2009 | Perry et al. ..................... 455/445 |
| 2009/0198982 | A1 * | 8/2009 | Levitan et al. ................. 712/239 |
| 2009/0228563 | A1 | 9/2009 | Jones et al. |
| 2009/0287761 | A1 | 11/2009 | Hawkins et al. |
| 2010/0077018 | A1 | 3/2010 | Acharya et al. |
| 2011/0106626 | A1 * | 5/2011 | Zender et al. .............. 705/14.64 |
| 2011/0106891 | A1 * | 5/2011 | Gallant et al. ................ 709/206 |

(Continued)

OTHER PUBLICATIONS

Brenna, Lars, et al., "Engineering Push-based Web Services", International Journal of Web Services Practices, vol. 1, No. 1-2 (2005), pp. 89-100.

(Continued)

Primary Examiner — Tesfay Yohannes
(74) Attorney, Agent, or Firm — Marcia L. Doubet (57) ABSTRACT A method, apparatus, and computer program product are disclosed for redirecting messages in a publish/subscribe messaging system in which redirection messages are received as messages for publication on a topic. Upon receiving a subsequent message for publication, the subsequent message will be redirected to a target message topic if the source message topic of the subsequent message matches a previously-recorded instruction to redirect messages from the source message topic to the target message topic.

10 Claims, 7 Drawing Sheets

(56) References Cited

U.S. PATENT DOCUMENTS

| | | | |
|---|---|---|---|
| 2011/0110267 A1* | 5/2011 | Gallant | 370/254 |
| 2011/0312300 A1* | 12/2011 | Silver et al. | 455/410 |
| 2012/0246337 A1 | 9/2012 | Ross | |
| 2012/0290656 A1 | 11/2012 | Jellard | |

OTHER PUBLICATIONS

Zhu, Yuqing, et al. "Ripple: A publish/subscribe service for multidata item updates propagation in the cloud". Journal of Network and Computer Applications 34(4): 1054-1067 (2011).

Edward G. Jellard, U.S. Appl. No. 13/429,380, filed Mar. 25, 2012, Office Action, Mar. 20, 2014, 14 pages.

* cited by examiner

| Subscription List ||
|---|---|
| User | Subscriptions |
| User 1 | ed/car |
| User 1 | news/# |
| User 2 | cars/Hampshire/# |
| User 3 | news/uk/IBM |

| Active Redirect and Alias List |
|---|
| cars/Hampshire/ed = Redirect: ed/car |
| news/uk/IBM - Alias: news/bbc/technology |
| - |

REDIRECTING MESSAGES IN A PUBLISH/SUBSCRIBE MESSAGING SYSTEM

BACKGROUND

The present invention relates to redirecting messages in a publish/subscribe messaging system.

Computer systems commonly provide communications between users, application programs, or a combination of the two, by the use of publish/subscribe messaging systems. In such systems, users or application programs may subscribe, via a message broker, to a message publication or topic. When a publisher publishes a message on a given topic, the message is forwarded to all the relevant subscribers to that topic.

In some scenarios, it is desirable to forward messages on one topic to another topic. For example, one topic may, for a time at least, be relevant to another topic or a topic may comprise an aggregation of a group of related topics. Creating such redirections is a relatively complex process that is performed by the administrator of the message broker application program that manages subscriptions to message topics, receives published messages, and passes messages to the relevant subscribers.

BRIEF SUMMARY

An embodiment of the present invention redirects messages in a publish/subscribe messaging system by: receiving a first message for publication on a target message topic, the first message comprising a predetermined message element indicating that the first message comprises an instruction to redirect messages for a source message topic to the target message topic; recording the first message; in response to receipt of a second message for publication on the source message topic, identifying any recorded message comprising an instruction to redirect messages for the source message topic to a target message topic; and if any instruction to redirect messages for the source message topic is identified, then redirecting the second message to the target message topic in the identified instruction.

Embodiments of the invention may be provided as methods, systems, or computer program products embodied on at least one computer-readable medium.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
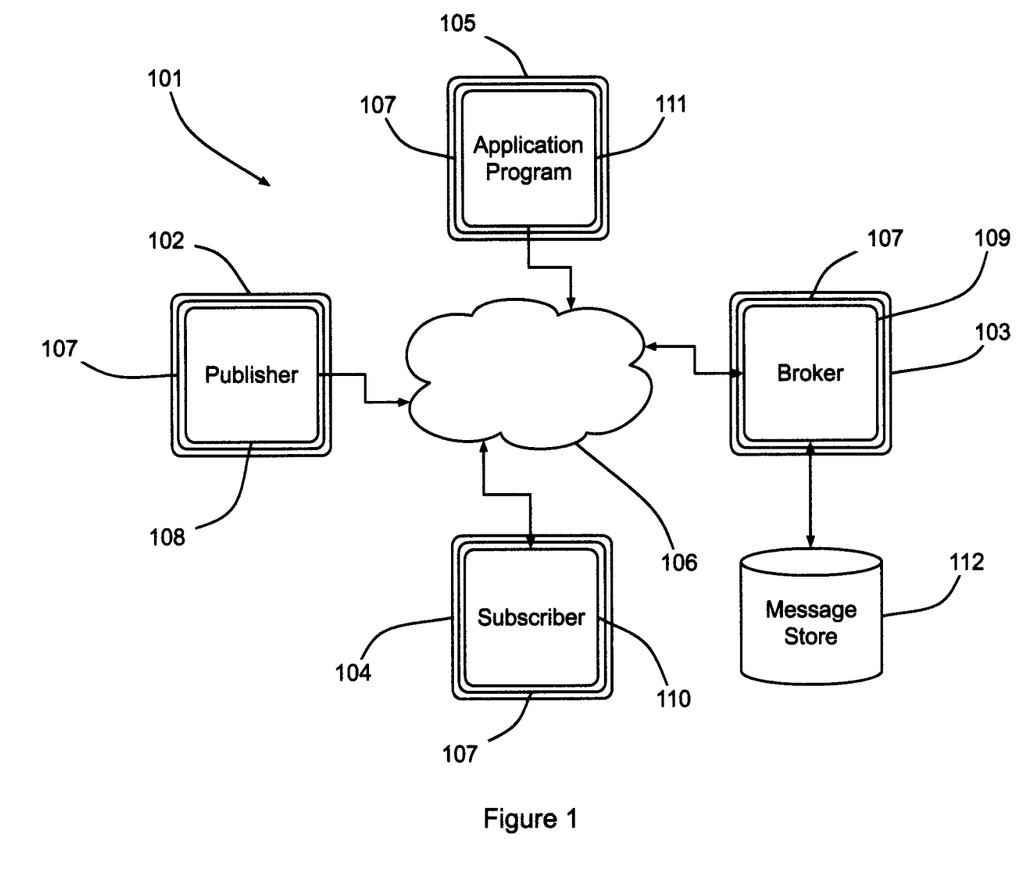
FIG. 1 is a schematic illustration of a computer system providing a publish/subscribe messaging system comprising a message broker application program.

With reference to FIG. 1, a computer system 101 comprises four computers 102, 103, 104, 105 interconnected by a network 106. Each of the computers 102, 103, 104, 105 is loaded with an operating system 107 arranged to provide a processing platform for one or more application programs. The first computer 102 is arranged to run a message publisher application program 108, the second computer 103 is arranged to run a message broker application program 109, and the third computer 104 is arranged to run a message subscriber application program 110. In the present embodiment, the message publisher, broker, and subscriber programs 108, 109, 110 are part of the IBM® WebSphere® messaging system provided by International Business Machines Corporation. ("IBM" and "WebSphere" are registered trademarks of International Business Machines Corporation in the United States, other countries, or both.) The fourth computer 105 is arranged to run a third party application program 111 which will be described in further detail below.

The publisher application program 108 enables a user to publish information in the form of messages on one or more message categories or topics. In the present embodiment, message topics are identified using universal resource identifiers (URIs). The subscriber application program 110 enables a user to subscribe to or unsubscribe from one or more message topics and consequently to receive messages published on those topics. The broker application program 109 is arranged to manage subscriptions to message topics requested by subscribers and to forward published messages received from publishers to the relevant subscribers. The computer system of FIG. 101 further comprises a storage device 112 connected to the broker application program 109 and used for storing messages, subscription data, and other message or subscription related data as described further below.

Figure 2A:
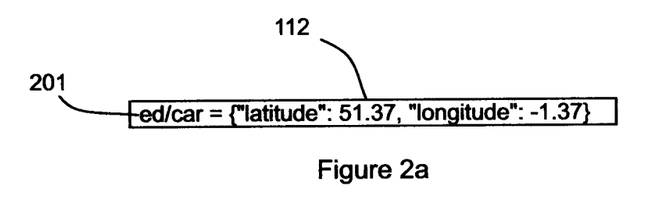
FIGS. 2a, 2b, and 2c are a set of examples of message redirection performed in the system of FIG. 1, in accordance with preferred embodiments of the present invention.

In the present embodiment, the third party application program 111 comprises functionality for managing the redirecting of messages from a first topic to a second topic by publishing redirection messages to the message broker 109. FIG. 2a shows an example of a published message 201 on the topic "ed/car". The published message 201 is stored in the message data on storage device 112 of the message broker 109.

Figure 2B:
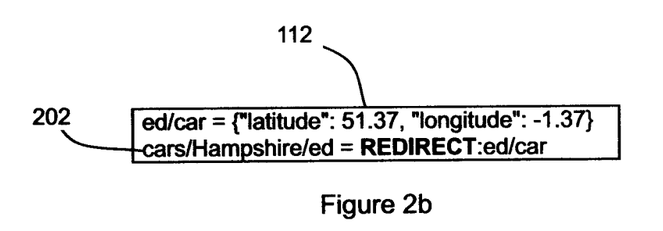

The third party application program 111 then publishes redirect message 202 as shown in FIG. 2b. In the present embodiment, the redirect message 202 has the general form:

<target topic URI>⇐ REDIRECT<source topic URI> where the term "REDIRECT" comprises a predetermined message element indicating to the message broker 109 that the message is an instruction to redirect messages from the source topic to the target topic. Any message on the source topic received subsequently to the redirect message will be redirected to the target topic. For example, with reference to FIG. 2c, a subsequent message 203 on the "ed/car" topic is redirected to the "cars/Hampshire/ed" topic. Thus the subsequent message 203 will be available to the subscribers of the target topic and to the subscribers of the source topic, that is, the subsequent message will be published on both the "ed/car" and "cars/Hampshire/ed" topics.

In the present embodiment, in order to cancel a redirect, the message broker 109 is responsive to a cancellation message from third party application program 111. In the present embodiment, the cancellation message has the following form:

<target topic URI>⇐ <null> where the empty or "null" string indicates to the message broker 109 that the message is an instruction to cancel existing redirect messages to the target topic. In response to such a cancellation message, the message broker 109 is arranged to identify and remove the relevant redirection and also to cancel any existing subscriptions to the target topic. Thus no further messages are redirected from the source topic to the target topic.

Figure 2C:
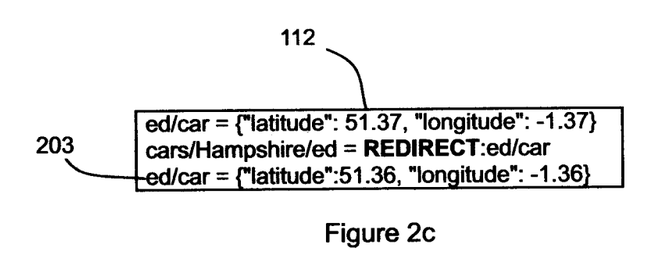

In the present embodiment, the message broker 109 is further arranged to be responsive to an alias message from the third party application 111. In the present embodiment, the alias message has the general form:

<target topic URI>⇐ALIAS<source topic URI> where the term "ALIAS" comprises a predetermined message element indicating to the message broker 109 that the message is an instruction to redirect messages from the source topic to the target topic and, for any such message published on the target topic, to change the message source to indicate that the message emanated from the target topic. Any message on the source topic received subsequently to the alias message will be redirected to the target topic. Thus the message will be available to subscribers of both the source and target topics but will appear to the user to emanate from the source and target topic, respectively. This is in contrast to the redirect message 202 above, where the source of a redirected message 203 is unchanged when published on the target topic. The aliasing of a topic is cancelled by the receipt at the broker 109 of a cancellation message in the same manner as described above for the cancellation of a redirect message 202.

In the present embodiment, while the redirect, alias, and cancellation messages are effectively published by their originator, such as the third party application 111, the message broker 109 is arranged to treat such messages as internal, administrative messages and, as such, does not publish such messages to the subscribers of the relevant source or target topics.

Figure 3A:
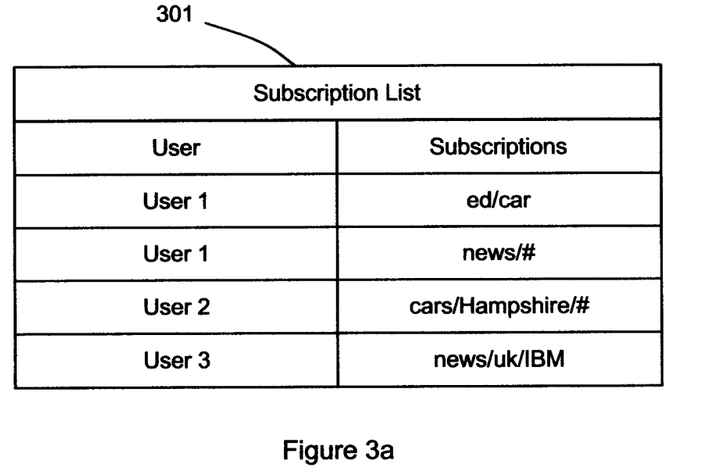
FIGS. 3a and 3b are tables illustrating data used in the message broker application program of FIG. 1 for redirecting messages, in accordance with preferred embodiments of the present invention.

With reference to FIG. 3*a*, in the present embodiment, the message broker 109 is arranged to maintain a subscription list 301. The subscription list 301 comprises a list of the current subscriptions for each subscriber application 110. The subscriber list 301 is used by the message broker 109 to identify the appropriate set of recipients for each published message received. The subscriber list 301 is also used when cancelling subscriptions when the corresponding redirected or aliased topic is cancelled as described above.

Figure 3B:
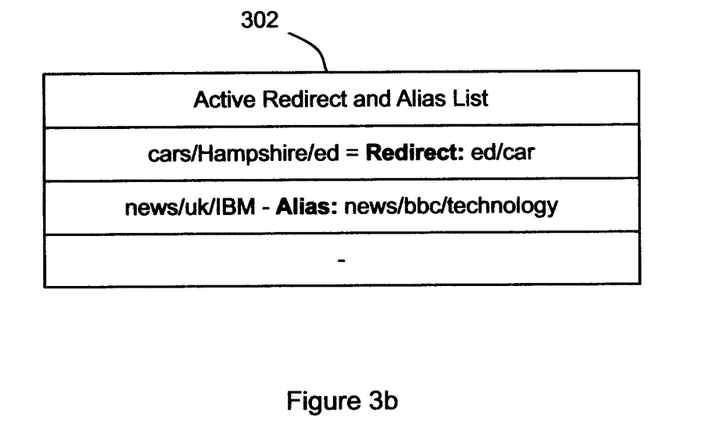

With reference to FIG. 3*b*, in the present embodiment, the message broker 109 is arranged to maintain a redirect and alias list 302. Each redirect or alias message published to the message broker 109 is recorded on the list 302. When a redirect or alias is cancelled, the corresponding message is removed from the list 302. Each time a message is received by the message broker 109 for publication on a given topic, the list 302 is searched for any redirection or aliasing of that topic. The received message is then published in accordance with any identified redirect or alias entry on the list 302.

Figure 4:
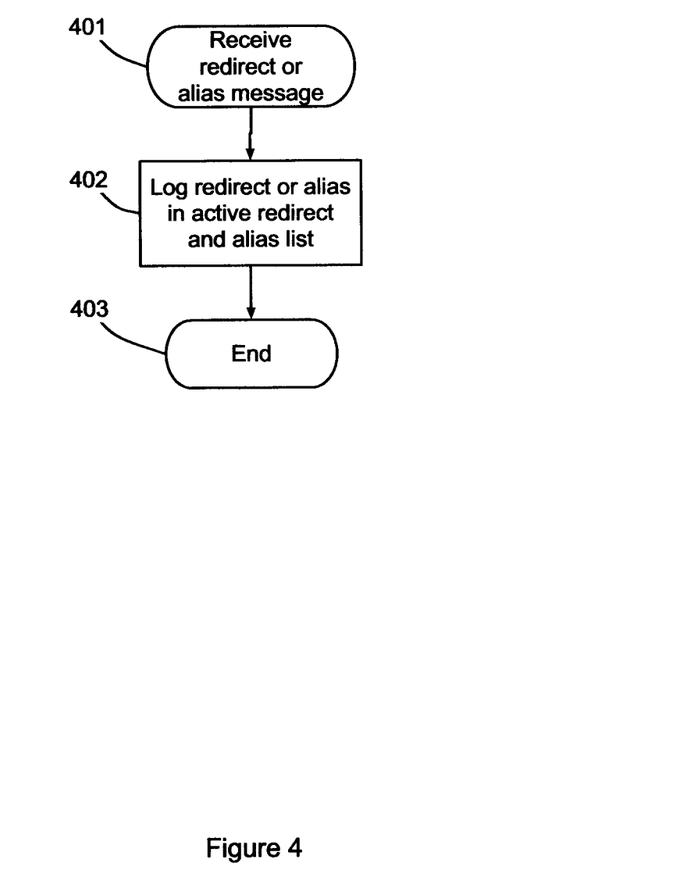
FIGS. 4, 5, 6, and 7 are flow charts illustrating processing performed by the message broker application program of FIG. 1 when managing and performing message redirection, in accordance with preferred embodiments of the present invention.

The processing performed by the message broker application program 109 in response to the receipt of a message comprising one of the predetermined message elements described above will now be described with reference to the flow chart of FIG. 4. Processing is initiated at step 401 in response to the receipt of a message comprising a predetermined message element, and processing moves to step 402. At step 402, the redirect or alias message is recorded in the active redirect and alias list 302. Processing then moves to step 403 and ends.

Figure 5:
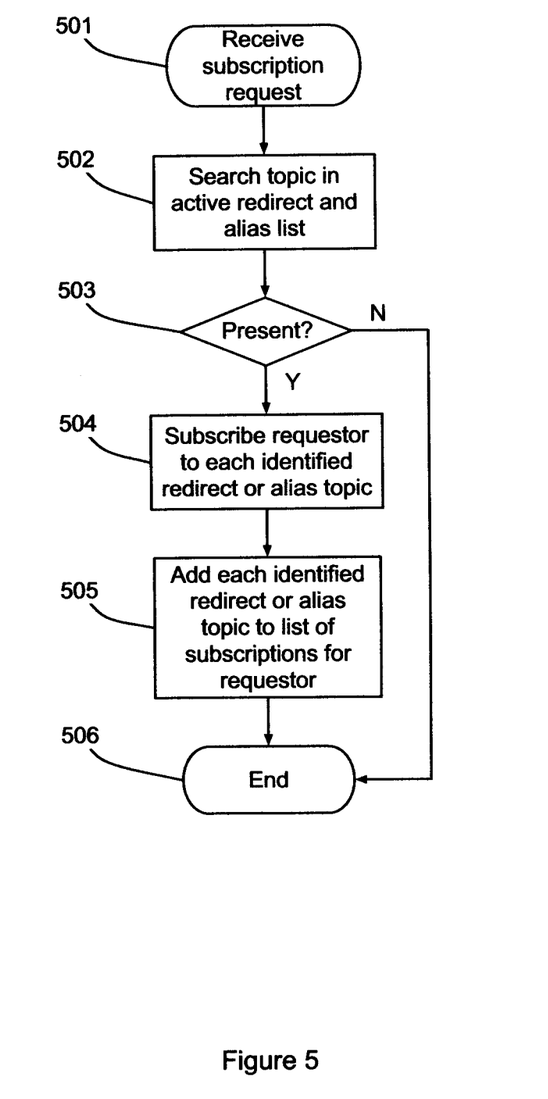

The processing performed by the message broker application program 109 in response to the receipt of a subscription request will now be described with reference to the flow chart of FIG. 5. Processing is initiated at step 501 in response to the receipt of a subscription request, and processing move to step 502. At step 502, the redirect and alias list 302 is searched for the requested subscription topic and processing moves to step 503. At step 503, if the requested subscription topic is present in the redirect and alias list 302, then processing moves to step 504. At step 504, the requestor is subscribed to each identified matching topic in the redirect and alias list 302, and processing moves to step 505. At step 505, each subscribed topic from the redirect and alias list 302 is added to the subscriptions list 301 for the requestor, and processing moves to step 506. At step 506, processing ends. If at step 503 the requested subscription topic is not present in the redirect and alias list 302, then the subscription is performed as normal for the requested topic, and processing then moves to step 506 and ends.

Figure 6:
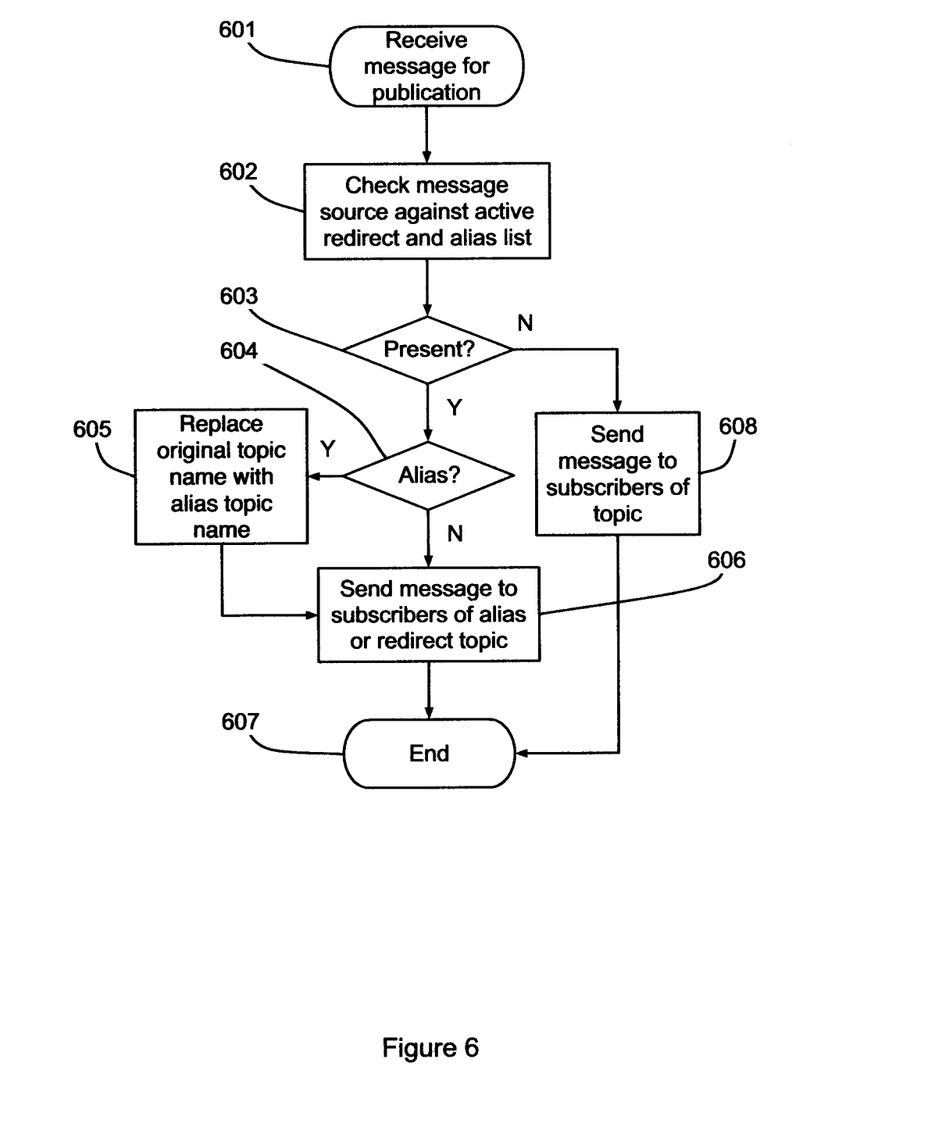

The processing performed by the message broker application program 109 in response to the receipt of a message for publication will now be described with reference to the flow chart of FIG. 6. Processing is initiated at step 601 in response to the receipt of a message for publication, and processing moves to step 602. At step 602, the source of the message is checked against the redirect and alias list 302, and processing moves to step 603. At step 603, if the message source corresponds to a message source of a redirection or aliasing entry in the list 302, then processing moves to step 604. At step 604, if the identified entry comprises an alias instruction, then processing moves to step 605. At step 605, the source of the message as indicated in the message itself is changed to identify the target topic as specified in the identified alias instruction, and processing moves to step 606. At step 606, the message is sent to all subscribers to the target topic as defined in the identified instruction, and processing moves to step 607 and ends. If at step 604 the identified entry comprises a redirect instruction, then processing moves to step 606 and proceeds as described above. If at step 603 the message source does not correspond to any message source of a redirection or aliasing entry in the list 302, then processing moves to step 608. At step 608, the message is sent to all subscribers of the relevant topic, and processing moves to step 607 and ends.

Figure 7:
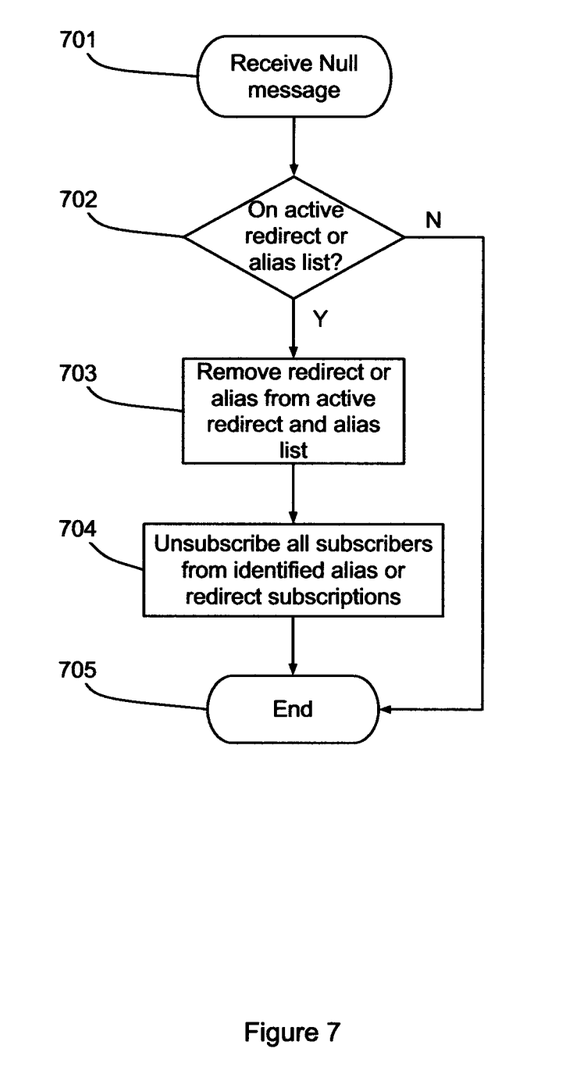

The processing performed by the message broker application program 109 in response to the receipt of a cancellation message (discussed earlier as a message having an empty, or null, string) will now be described with reference to the flow chart of FIG. 7. Processing is initiated at step 701 in response to the receipt of a cancellation message, and processing moves to step 702. At step 702, the redirect and alias list 302 is searched to identify any entries with source topics corresponding to that specified in the cancellation message. If an entry is identified in the list, then processing moves to step 703. At step 703, the identified redirect or alias entry is removed from the list 302, and processing moves to step 704. At step 704, any entry in the subscription list 301 corresponding to the target topic of the cancelled redirect or alias is removed from the list 301, and processing moves to step 705 and ends. If at step 702 no corresponding entry is identified in the redirect and alias list 302, then processing moves to step 705 and ends.

In another embodiment, the functionality to redirect or alias a topic by publishing a message to that topic is provided in the publisher application program 108. As will be understood by those in the art, such additional functionality may be integrated into the publisher application program 108 or provided by an ancillary program such as a plug-in.

In a further embodiment, instead of maintaining a redirect and alias list, the message broker is arranged to record the redirect or alias messages for the relevant topic on the message topic tree. The message broker searches the message topic tree appropriately each time a published message is received to determine whether or not any redirect or alias is present before publishing the message to the appropriate set of subscribers.

In another embodiment, multiple source topics may be redirected or aliased to a given target topic. In this embodiment, the cancellation message is arranged to provide more detail to the message broker by specifying which redirect or alias should be cancelled. In the present embodiment, the cancellation message has the general form:

<target topic URI>⇐ CANCEL<source topic URI> where the source topic is specified after the predetermined message element in the form of the term "CANCEL". As will be understood by those in the art, the cancellation message specified for this embodiment may be used in the other embodiments described herein in place of the null string format.

As will be understood by those in the art, embodiments of the invention may be provided in any networked or single platform messaging system that operates between user-controlled messaging programs or automatically-controlled messaging programs.

As will be understood by those in the art, the predetermined message elements may comprise any suitable word or other code. The message broker application may be provided with a global configuration option that instructs it how to deal with particular message elements. The message broker may be arranged to default to an aliasing option, that is, an option in which the source of a published message is masked from the subscriber to the relevant topic.

It will be understood by those skilled in the art that the apparatus that embodies a part or all of the present invention may be a general purpose device having software arranged to provide a part or all of an embodiment of the invention. The device could be a single device or a group of devices, and the software could be a single program or a set of programs. Furthermore, any or all of the software used to implement the invention can be communicated via any suitable transmission or storage means so that the software can be loaded onto one or more devices.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples, shown and described. Accordingly, departures may be made from such details without departure from the scope of applicant's general inventive concept.

The invention claimed is:

1. A method for redirecting messages in a publish/subscribe messaging system, the method comprising:
   receiving a first message at an entity of the messaging system that is configured to receive messages for publication on a message topic specified in the received messages, the first message comprising a predetermined message element indicating that the first message is not a message for publication and instead comprises an instruction to redirect messages for a source message topic to a target message topic;
   recording, by the entity, the instruction to redirect messages for the source message topic to the target message topic according to the first message;
   responsive to receiving, at the entity, a second message for publication on the source message topic, identifying the recorded instruction to redirect messages for the source message topic to the recorded target message topic; and
   responsive to identifying the recorded instruction, performing: publishing, by the entity, the second message to subscribers of the source message topic and;
   redirecting, by the entity, the second message by publishing the second message to subscribers of the recorded target message topic, wherein when redirecting the second message to the target message topic according to the identified instruction, a message source indicated in the second message is aliased by replacing the indicated message source with an indication of the target message topic, thereby causing the published second message to indicate that the second message emanated from the target message topic instead of from the source message topic.

2. The method according to claim 1, further comprising:
   receiving a third message at the entity, the third message comprising a predetermined message element indicating that the third message is not a message for publication and instead comprises an instruction to cancel the previously-recorded instruction to redirect messages for the source message topic to the target message topic; and
   removing the recorded instruction to redirect messages from the source message topic to the target message topic.

3. The method according to claim 2, further comprising cancelling, by the entity, any existing subscriptions to the target message topic in response to the receipt of the third message.

4. The method according to claim 1, wherein the aliasing of the message source is performed responsive to presence of an alias indicator in the predetermined message element.

5. The method according to claim 1, wherein the first message is stored on a topic tree for the first message.

6. The method according to claim 1, wherein the first message comprises a first topic identifier identifying the target message topic, a second topic identifier identifying the source message topic, and the predetermined message element.

7. The method according to claim 1, wherein each of the source message topic and the target message topic is identified by a universal resource identifier (URI).

8. The method according to claim 1, wherein the entity comprises a message broker application program.

9. The method according to claim 1, wherein the first message is received from a third party application program.

10. The method according to claim 8, wherein the first message is received by the message broker application program from a message publisher application program.

* * * * *